United States Patent
Edwards et al.

(10) Patent No.: US 10,128,779 B2
(45) Date of Patent: Nov. 13, 2018

(54) INDUCTION MOTOR LONG START PROTECTION

(71) Applicant: SCHNEIDER ELECTRIC USA, INC., Palatine, IL (US)

(72) Inventors: Benjamin W. Edwards, Rolesville, NC (US); Kevin M. Jeffries, Raleigh, NC (US); Richard K. Weiler, Wake Forest, NC (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 14/822,675

(22) Filed: Aug. 10, 2015

(65) Prior Publication Data
US 2017/0047869 A1 Feb. 16, 2017

(51) Int. Cl.
| | |
|---|---|
| *H02H 6/00* | (2006.01) |
| *H02H 3/34* | (2006.01) |
| *H02P 1/26* | (2006.01) |
| *H02P 1/00* | (2006.01) |

(52) U.S. Cl.
CPC . *H02P 1/26* (2013.01); *H02P 1/00* (2013.01)

(58) Field of Classification Search
CPC .............................. H02H 6/00; H02H 3/343
USPC .................................... 318/778, 782; 361/30
See application file for complete search history.

(56) References Cited

U.S. PATENT DOCUMENTS

| | | | |
|---|---|---|---|
| 3,818,270 A | 6/1974 | Hagiz | |
| 4,288,737 A * | 9/1981 | McClain | G05F 1/38 318/815 |
| 4,547,720 A | 10/1985 | Loudon | |
| 4,600,961 A * | 7/1986 | Bishop | H02H 3/343 361/76 |
| 4,636,702 A | 1/1987 | Hedges | |
| 5,436,784 A * | 7/1995 | Schweitzer, III | H02H 6/00 361/103 |
| 5,786,708 A * | 7/1998 | Premerlani | G01R 31/343 324/545 |

(Continued)

OTHER PUBLICATIONS

DeCastro, Jose E., et al. "Stall protection of large induction motors." IEEE Transactions on Industry Applications 31.5 (1995): 1159-1166.

(Continued)

*Primary Examiner* — Eduardo Colon Santana
*Assistant Examiner* — Cortez Cook
(74) *Attorney, Agent, or Firm* — Locke Lord LLP

(57) ABSTRACT

Method and system for protecting induction motors from stalled start conditions provide a motor overload protection device that includes a stalled start detector capable of differentiating long start from stalled start conditions. This helps the motor overload protection device identify a stalled start condition right away and trip immediately rather than allowing the motor to continue drawing locked rotor current for the duration of the startup interval. Such a motor overload protection device may be used with any suitable multiphase induction motors, including two-phase motors, three phase motors, and the like. And because only the motor phase currents are used to detect the stalled start condition, the motor overload protection device disclosed herein does not require voltage phase shift information and/or motor speed measurements, thereby simplifying overall management of the motor.

14 Claims, 5 Drawing Sheets

(56) References Cited

U.S. PATENT DOCUMENTS

| | | | |
|---|---|---|---|
| 5,883,489 A * | 3/1999 | Konrad | F04D 15/0066 318/805 |
| 2003/0088799 A1 | 5/2003 | Bodas | |
| 2004/0254750 A1* | 12/2004 | Macfarlene | G01R 22/065 702/61 |
| 2005/0067992 A1 | 3/2005 | El-Ibiary et al. | |
| 2011/0149446 A1* | 6/2011 | Moreira | H02H 7/0822 361/30 |
| 2013/0311113 A1* | 11/2013 | Basu | G01R 31/343 702/58 |
| 2013/0314822 A1 | 11/2013 | Dio | |

OTHER PUBLICATIONS

EP Extended Search Report for EP Application No. 16181873.7 dated Jan. 30, 2017.

C.L. Fortescue, Method of Symmetrical Co-ordinates Applied to the solution of Polyphase Networks, American Institute of Electrical Engineers, Jun. 28, 1918, Atlantic City, N.J.

\* cited by examiner

INDUCTION MOTOR LONG START PROTECTION

FIELD OF THE INVENTION

The disclosed embodiments relate generally to induction motors and particularly to methods and systems for detecting and protecting such induction motors from a long start condition.

BACKGROUND OF THE INVENTION

Induction motors are widely used in industrial applications owing to their low cost and high efficiency and reliability, among other benefits. A typical induction motor includes a stationary member, or stator, having a plurality of windings thereon and a rotating member, or rotor, rotatably disposed within the stator. Applying a sinusoidal or alternating voltage to the stator windings induces a rotating magnetic field that causes the rotor to rotate. Induction motors typically operate on single-phase and three-phase voltages, although two-phase induction motors are also available.

Various techniques exist for starting an induction motor. One such technique is direct on-line (DOL) starting in which the terminals of the motor are directly connected to a power supply, which is typically connected to the AC main. With DOL starting, a three-phase induction motor may draw between five to eight times its rated full load current immediately after startup, known as "locked rotor" current. As the motor accelerates, the load current drops slightly until the motor reaches about 70% to 80% of its full speed, after which the load current drops more rapidly toward the normal running current of the motor. The time it takes the motor to reach full speed is called the "startup" time and may last several seconds, depending on the size of the motor and the inertia of the driven system.

Most motor overload protection devices that protect induction motors from current overload take the above startup time into account before disconnecting power to the motors. These devices, which may include circuit breakers, overload relays, and other types of circuit interruption devices, typically delay tripping for some number of seconds based on the "trip class" of the device to accommodate the startup time. A higher trip class may be used for motors that have higher inertia loads, and so on, with some overload protection devices allowing up to 30 seconds for the motor to reach full speed before tripping, known as a "long start."

Sometimes a motor is stalled or otherwise unable properly to start due to excessive load, motor damage, or other reasons. When this happens, the motor stills draws locked rotor current, but does not rotate or start because the motor has stalled or jammed. Stalled starts, however, are not typically differentiated from long starts in existing overload protection devices. These overload protection devices typically allow a stalled motor to continue drawing locked rotor current until the designated startup period expires before tripping. Such an extended interval of locked rotor current in the motor windings may damage the motor and power supply circuits, generate excessive heat, especially if the motor cooling system is not working, which is often the case when the motor is stalled, and require longer cool down periods before subsequent restarts are allowed.

To address the above problem, certain high end overload protection devices use analysis of phase shifts that may exist between supply voltage and motor current to detect a stalled start. Other overload protection devices use a tachometer to directly measure motor speed and thereby detect a stalled start. Motor speed may also be estimated, for example, using rotor bar harmonics and the like. However, in addition to increasing complexity and cost, some of these techniques, such as the use of rotor bar harmonics to estimate motor speed and the like, do not function during transient conditions like during a motor start.

Thus, a need exists for an improved way to detect and protect induction motors from stalled start conditions.

SUMMARY OF THE DISCLOSED EMBODIMENTS

The embodiments disclosed herein are directed to a method and system for detecting and protecting induction motors from stalled start conditions. The method and system provide a motor overload protection device that includes a stalled start detector capable of differentiating between long starts and stalled start conditions. The stalled start detector uses motor phase currents to determine whether the motor is starting correctly or has stalled. This lets the overload protection device identify a stalled start condition right away and trip immediately rather than allowing the motor continue to draw locked rotor current for the duration of the startup period. Such an overload protection device may be a circuit breaker, overload protection relay, or other type of circuit interruption device, and may be used with any suitable multiphase induction motor, including two-phase motors, three-phase motors, and the like. And because only the motor phase currents are used to detect the stalled start, the motor overload protection device disclosed herein does not require voltage phase shift information and/or motor speed measurements, thereby simplifying the overall management of the motor.

In some embodiments, the stalled start detector of the overload protection device disclosed herein takes advantage of the fact that, as a practical matter, most multiphase induction motors have a slight imbalance between their phase voltages and currents. This imbalance may be modeled as three balanced sets of phase sequences using the well-known symmetrical components transform. In a three-phase motor having phases "a," "b," and "c," for example, the phase imbalance may be represented using one balanced set having phase sequence "a-b-c," a second balanced set having phase sequence "a-c-b," and another balanced set having all three phases aligned. These balanced sets, referred to as positive, negative, and zero phase sequences, respectively, may then be used to calculate a stall indicator.

In some embodiments, the stall indicator may be the ratio of the magnitude of the current for the positive sequence to the magnitude of the current for the negative sequence. This ratio changes based on the speed of the motor and may be used as an indication of the status of the motor. As motor speed increases from zero, the positive sequence current magnitude decreases and the negative sequence current magnitude increases, resulting in a progressively smaller ratio. If the ratio remains substantially the same, then the motor is neither accelerating nor decelerating. Thus, by looking for a change (decrease) in the ratio of the positive to negative phase sequence current magnitudes during startup, the stalled start detector may be able to detect whether the motor is starting properly or whether there it is stalled.

In some embodiments, the stalled start detector may perform the above detection by obtaining measurements of the motor phase currents during motor startup. The measurements may be obtained, for example, using a current sensor connected to the motor terminals to measure the magnitudes of the motor phase currents. The sensor preferably is capable of measuring the motor phase currents at a sufficiently high sampling rate to allow the stalled start detector to calculate the positive and negative sequence current magnitudes in near real time. The stalled start detector may then use these measurements to derive the positive and negative sequence current magnitudes using well-known symmetrical components transformations. The ratio of the positive sequence current magnitude to the negative sequence current magnitude may then be monitored to detect any changes during the startup interval. Thus, for example, if the stalled start detector detects that the ratio is decreasing, then this means the motor is accelerating and hence starting properly. On the other hand, if the stalled start detector detects that the ratio is not changing for at least a portion (e.g., 50%) of the startup interval, then this means the motor is not accelerating and is likely stalled, in which case the overload protection device may trip immediately to disconnect the motor from the power supply.

In some embodiments, in addition to the ratio of the positive and negative sequence current magnitudes not changing, the stalled start detector may also require the measured phase currents to be at least twice the motor full load current in order to ensure that the motor is drawing locked rotor current to indicate a malfunction. In some embodiments, the stalled start detector may also artificially inject or otherwise create an imbalance between the motor phase voltages in order to ensure the motor phase currents may properly be modeled using the three balanced sets of phase sequences.

In general, in one aspect, the disclosed embodiments relate to a method of detecting a stalled start in a multiphase induction motor. The method comprises, among other things, obtaining measurements of motor phase currents during a startup interval of the induction motor, deriving a magnitude of a positive sequence of the motor phase currents during the startup interval using the measurements of the motor phase currents, and deriving a magnitude of a negative sequence of the motor phase currents during the startup interval using the measurements of the motor phase currents. The method further comprises calculating a stall indicator using the magnitude of the positive sequence and the magnitude of the negative sequence, and removing power provided to the induction motor if the stall indicator meets a predefined criterion.

In general, in another aspect, the disclosed embodiments relate to a detector for detecting a stalled start in a multiphase induction motor. The detector comprises, among other things, a motor current acquisition module configured to obtain measurements of motor phase currents during a startup interval of the induction motor, and a positive and negative sequence module configured to transform the motor phase currents into a positive phase sequence current and a negative phase sequence current. The detective further comprises a stall indication module configured to derive a ratio of a magnitude of the positive current phase sequence to a magnitude of the negative phase sequence current. The detector is configured to cause the induction motor to be removed from a power supply thereof if the ratio remains substantially unchanged from a previously derived ratio during the startup interval.

In general, in yet another aspect, the disclosed embodiments relate to a motor management system for a multiphase induction motor. The system comprises, among other things, a power supply configured to provide power to the induction motor, and a controller connected to the power supply and configured to control the power provided to the induction motor by the power supply. The system further comprises an overload protection device connected to the power supply and configured to calculate a positive phase sequence current magnitude and a negative phase sequence current magnitude from the power provided to the induction motor during a startup interval of the induction motor. The overload protection device is further configured to remove the power provided to the induction motor based on a ratio of the positive phase sequence current magnitude to the negative phase sequence current magnitude.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
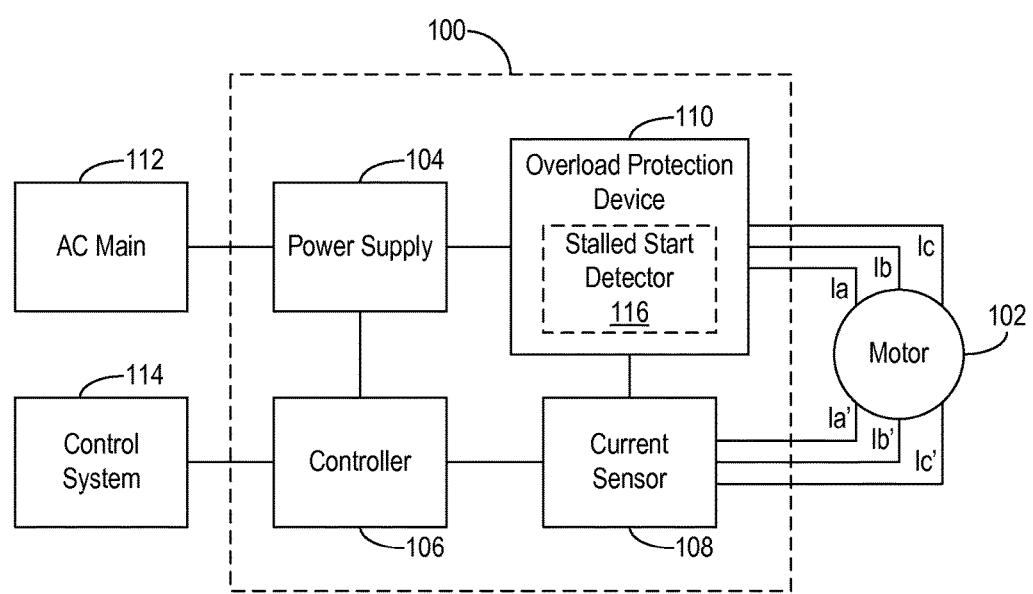
FIG. 1 is a block diagram of an induction motor management system according to some implementations of the disclosed embodiments.

Referring now to FIG. 1, a block diagram of a motor management system 100 for an AC motor 102, such as an induction motor, is shown according to one or more embodiments disclosed herein. The motor 102 in this example is a typical three-phase induction motor having a stator (not expressly shown), a rotor (not expressly shown) rotatably disposed within the stator, and driven by three phase currents Ia, Ib, and Ic. Although a three-phase motor is shown, it should be understood that a two-phase or other type of multiphase induction motor may also be used without departing from the scope of the disclosed embodiments. As can be seen, the motor management system 100 has several main components, including a power supply module 104, a controller 106, a current sensor 108, and an overload protection device 110. An AC main 112 provides power for the motor 102 through the power supply module 104 and an external control system 114 provides overall control of the motor 102 through the controller 106.

In general operation, the power supply module 104, which may be for example an Intelligent Power Module (IPM), converts AC power from the AC main 112 into three phase currents Ia, Ib, and Ic for starting and running the motor 102. The controller 106 is typically a microcontroller unit (MCU) programmed to control the power supply module 104 to produce the appropriate amplitudes and phase angles for the phase currents Ia, Ib, and Ic. These amplitudes and phase angles may be derived by the controller 106 using real-time or near real-time measurements of the actual phase currents Ia', Ib', and Ic' in the motor 102 provided by the current sensor 108. Any suitable current sensor 108 may be used, including a Hall effect sensor, current transformer, and the like, that is capable of measuring the phase currents Ia', Ib', and Ic' in the motor 102 in real time or near real time. The overload protection device 110, which may be for example a circuit breaker, overload relay, and the like, disconnects or otherwise removes the power supply module 104 from the motor 102 upon detection of an overload current in the motor 102.

In accordance with the disclosed embodiments, the overload protection device 110 includes a stalled start detector 116 configured to detect and differentiate between a permissible long start and a problematic stalled start in the motor 102. This stalled start detector 116 may be implemented as software, hardware, or a combination of software and hardware in the overload protection device 110. The stalled start detector 116 is capable of determining whether the motor 102 is accelerating or decelerating, or whether it is maintaining a nearly constant speed, which means the motor 102 has stalled, through analysis of the motor phase currents. Such information may then be used by the overload protection device 110 to disconnect or otherwise remove the motor 102 from the power supply module 104 immediately upon detecting a stalled start condition rather than waiting for overload current conditions to be met. The ability to detect a stalled motor using only phase currents avoids the need to obtain voltage phase shift information, motor speed measurements, or other information that may make the motor more expensive and/or impractical.

Operation of the stalled start detector 116 may be described with reference to FIGS. 2A and 2B, which show circuit models 200a and 200b, respectively, representing the impedance for one phase of the three-phase induction motor 102. These models are based on the recognition that, in practice, most multiphase induction motors have a slight imbalance between their phase voltages and currents. By employing the well-known symmetrical components transform, the phase imbalance may be represented as three balanced sets of phase sequence currents: a positive phase sequence "a-b-c," a negative phase sequence "a-c-b," and a zero phase sequence. Most induction motors are connected without a neutral conductor, so the influence of the zero phase sequence current may be ignored for purposes of the present disclosure. Using the symmetrical components transform and applying the resulting positive and negative phase sequence voltages to their respective circuits produces a more accurate model of the motor.

Figure 2A:
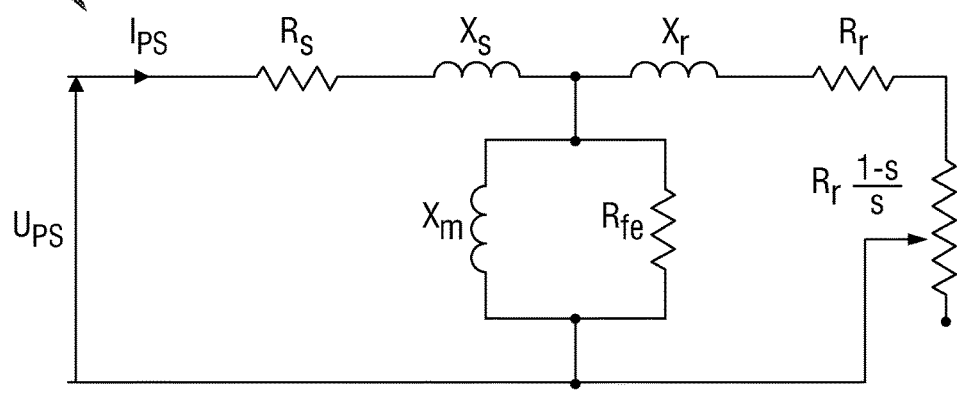
FIGS. 2A and 2B are circuit models for an induction motor using positive and negative phase sequences, respectively, according to some implementations of the disclosed embodiments.

Referring first to FIG. 2A, the circuit model 200a represents the impedance of the positive phase sequence current. In this model, $U_{PS}$ is the positive phase sequence voltage, $I_{PS}$ is the positive phase sequence current, $R_s$ is the stator resistance, $X_s$ is the stator leakage reactance, $X_m$ is the magnetizing reactance, $R_{fe}$ is the magnetizing resistance, $X_r$ is the rotor leakage reactance, and $R_r$ is the rotor resistance. This rotor resistance may vary according to the speed of the motor 102, as indicated by the variable resistance, $R_r(1-s)/s$. The speed of the motor 102 is represented by the slip, s, which has a value of 1 when the motor is stopped and is near zero when the motor is running at full speed. When the slip is 1, the variable resistance is 0 and the rotor resistance for the positive sequence current is simply $R_r$. When the slip is near 0 (e.g., 0.05), the rotor resistance for the positive sequence current is approximately 20 $R_r$. This variation in rotor resistance is the main reason for the high starting current exhibited by induction motors.

Figure 2B:
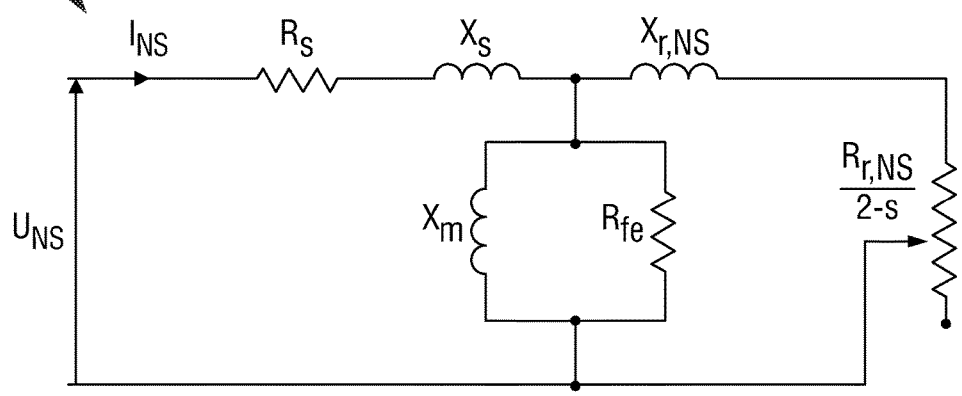

FIG. 2B shows the circuit model 200b representing the impedance for the negative phase sequence current. In this model, $U_{NS}$ is the negative phase sequence voltage, $I_{NS}$ is the negative phase sequence current, $R_s$ is again the stator resistance, $X_s$ is again the stator leakage reactance, $X_m$ is again the magnetizing reactance, $R_{fe}$ is again the magnetizing resistance, $X_{rNS}$ is the negative sequence rotor leakage reactance, and $R_{rNS}/(2-s)$ is the rotor resistance as varied according to the speed of the motor 102.

The primary difference between the two circuit models 200a and 200b is in the part of the circuits that represents the rotor resistance $R_r$. When the slip is 1, meaning the motor 102 is stopped, the negative phase sequence has a rotor resistance that is the same as the rotor resistance of the positive phase sequence, $R_r$. But when the slip is near 0 (e.g., 0.05), meaning the motor 102 is running at full speed, the negative phase sequence has a rotor resistance of only slightly more than 0.5 $R_r$, whereas the rotor resistance for the positive phase sequence is approximately 20 $R_r$. This difference helps explain why an imbalance in the motor phase voltages, which is what gives rise to the negative phase sequence voltage, is often a problem for induction motors. The motor presents essentially the same low impedance to negative phase sequence voltage at all speeds that it presents to the positive phase sequence voltage when stalled. Thus, assuming that the locked rotor current is between 6 and 8 times the full load running current, a negative phase sequence voltage magnitude of only 5% would result in between 30% and 40% more current in the motor when running The salient point above is that the voltage imbalance may be represented using a negative phase sequence, which in turn allows a stalled motor condition to be detected according to the embodiments disclosed herein. It is therefore important that some amount of imbalance exists in the phase voltages being fed to the motor 102. Most practical motor implementations have typically less than 0.5% phase imbalance (2 volts at 460 VAC). This phase imbalance, while small, is sufficient to create a negative phase sequence current, with the exact magnitude of the negative phase sequence current being dependent on a number of motor characteristics, including the amount of unbalance. In a typical motor, for example, the magnitude of the negative phase sequence current falls between 2% and 5% of the motor full load running current. As an alternative, a phase imbalance may be intentionally introduced in some embodiments, for example, by adding impedance to one phase or using other techniques known to those having ordinary skill in the art.

In accordance with the disclosed embodiments, the stalled start detector 116 detects a stalled motor condition by using the discovery that with an unbalanced three-phase voltage feeding an induction motor, the ratio between the positive and negative phase sequence current magnitudes changes based on the speed of the motor. Specifically, as motor speed increases from zero, the negative phase sequence current magnitude increases, the positive phase sequence current magnitude becomes smaller, and the ratio decreases. This allows the stalled start detector 116 to determine whether the motor 102 is accelerating and therefore starting properly or whether it has stalled, basically by monitoring the change in the ratio of the current magnitudes. These current magnitudes may be calculated by applying the well-known symmetrical components transform to the three phase currents (see, e.g., "Method of Symmetrical Co-Ordinates Applied to the Solution of Polyphase Networks," AIEE Transactions, Vol. 37, Part II, pp. 1027-1140 (1918)).

Once the positive and negative phase sequence current magnitudes are known, the stalled start detector 116 may use these current magnitudes to derive a stall indicator, SI, by calculating the ratio of the positive phase sequence current magnitude to the negative phase sequence current magnitude, for example, SI=10/1. The stalled start detector 116 may then monitor this stall indicator during the motor startup interval to determine whether the motor 102 is starting properly or whether it has stalled. If the stall indicator is changing (decreasing) during the motor startup interval, then the motor 102 is accelerating and therefore starting properly. The change is largely unaffected by variations in stator resistance and is also independent of the specific values of the current magnitudes. It is also independent of the percent of voltage imbalance as well as other factors and parameters, including motor specific parameters, assuming these factors and parameters stay constant during the motor startup interval. Thus, by checking for a change in the stall indicator during motor startup, the stalled start detector 116 may determine whether the motor 102 is starting properly or has stalled.

Figure 3:
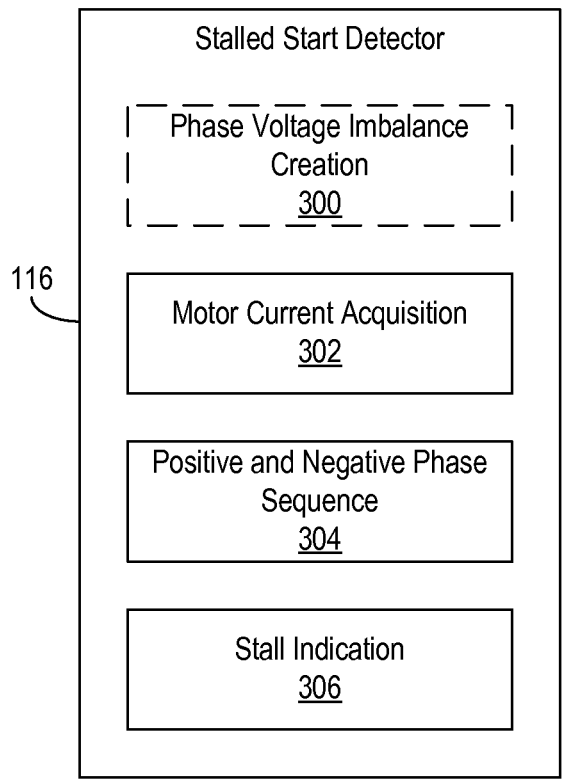
FIG. 3 is a block diagram of a stalled start detector according to some implementations of the disclosed embodiments.

An exemplary implementation of the stalled start detector 116 is shown in FIG. 3 according to some embodiments. As can be seen in FIG. 3, the exemplary stalled start detector 116 has a number of functional modules depicted as discrete blocks, including a motor current acquisition module 302, a positive and negative phase sequence module 304, and a stall indication module 306. An optional phase voltage imbalance creation module 300 may also be included in some embodiments to ensure an imbalance in the phase voltages provided to the motor 102. Those having ordinary skill in the art will of course understand that any one of the foregoing blocks 300-306 may be divided into several constituent blocks and that two or more of these blocks may be combined into a single block as needed without departing from the scope of the disclosed embodiments.

In general operation, the optional phase voltage imbalance creation module 300 is responsible for introducing an imbalance in the phase voltages provided to the motor 102. As mentioned above, such a phase imbalance may be introduced using any suitable method known to those having ordinary skill in the art, including by introducing an impedance in one phase. The phase current acquisition module 302 is responsible for acquiring and storing the magnitudes and phase angles of the motor phase currents Ia', Ib', and Ic'. These magnitudes and phase angles may be obtained by the phase current acquisition module 302 from the current sensor 108 discussed earlier with respect to FIG. 1.

The positive and negative phase sequence module 304, as the name suggests, is responsible for transforming the phase currents Ia', Ib', and Ic' into a positive phase sequence current and a negative phase sequence current. A zero phase sequence current also arises, but may be ignored herein due to the lack of a neutral conductor in most induction motors. In some embodiments, the positive and negative phase sequence module 304 may transform the motor phase currents Ia', Ib', and Ic' by determining the fundamental frequency ω of the phase currents, the magnitudes of the phase currents, and the dominant phase sequence, either a-b-c or a-c-b, from the motor phase currents. The module 304 may then perform the symmetrical components transform on the motor phase currents at the fundamental frequency ω using the dominant phase sequence a-b-c or a-c-b as the positive phase sequence to produce a positive phase sequence current I(+) and a negative phase sequence current I(−).

The stall indication module 306 thereafter uses a transient analysis of the positive and negative sequence current magnitudes to determine whether the motor 102 is starting correctly or has stalled. Specifically, the stall indication module 306 calculates a stall indicator by taking a ratio of the positive phase sequence current to the negative phase sequence current, then checking whether the ratio is changing (decreasing) or remains substantially unchanged during the motor startup interval. In some embodiments, in addition to checking for a lack of change in the ratio, the stall indication module 306 may also require the motor phase currents to have a magnitude of at least two times the magnitude of the motor full load current during the startup interval. This requirement confirms that the motor 102 is drawing locked rotor current and is therefore truly stalled.

Figure 4:
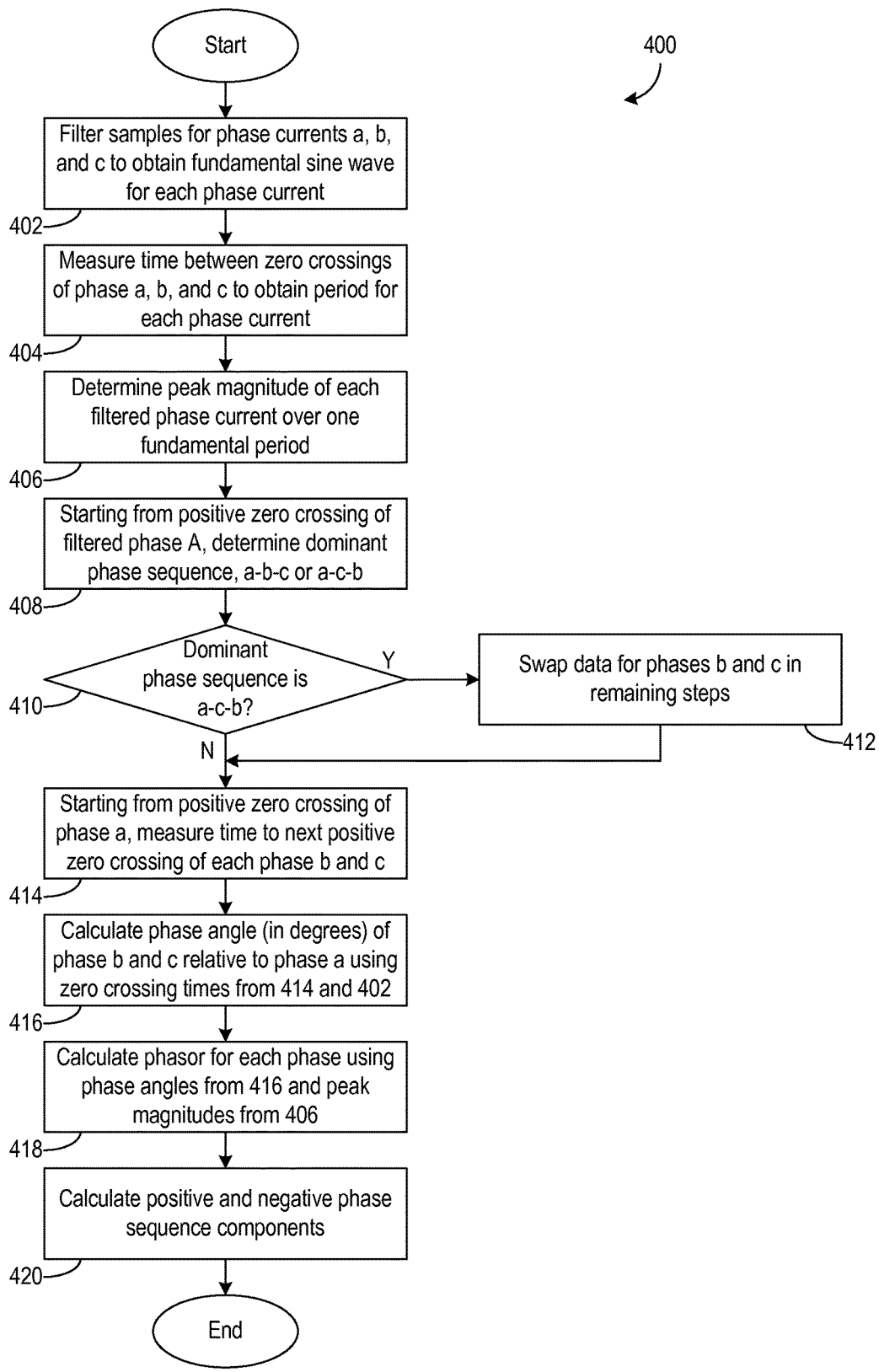
FIG. 4 is a flowchart of a method for calculating positive and negative phase sequences according to some implementations of the disclosed embodiments.

Additional details of the operation of the positive and negative phase sequence module 304 are provided in FIG. 4 via a flow chart 400 according to some embodiments. This flow chart 400 shows an exemplary method for determining the positive and negative sequence components of a 3-phase system using samples of 3-phase current magnitudes. The flow chart 400 generally begins at block 402, where samples of the three phase currents (e.g., from an analog-to-digital converter) are passed through digital low pass filters so the remaining signals represent mainly the fundamental 50/60 Hz sine waves of the phase currents. At block 404, the filtered phase currents are used to measure the time between zero crossings of phase a, phase b and phase c. These three time intervals are then averaged and multiplied by two to get the fundamental period of the filtered phase currents.

Next, at block 406, the peak magnitude of each filtered phase current is determined over one fundamental period. This may be done, for example, by identifying a positive going zero crossing (i.e., a zero crossing where the current switches from a negative to a positive magnitude) of the filtered phase a, then determining which filtered phase current, b or c, has the next positive going zero crossing. If phase b has the next positive going zero crossing, then the dominant phase sequence is a-b-c (i.e., positive). If phase c has the next positive going zero crossing, then the dominant phase sequence is a-c-b (i.e., negative).

Thereafter, at block 410, a determination is made whether the dominant phase sequence is a-c-b. If the determination is yes, then the data for phase b and phase c are swamped in the remaining steps. Otherwise, at block 414, starting from a positive going zero crossing of phase a, the time until the next positive going zero crossing of phase b and phase c are measured. At block 416, the phase angle (in degrees) of phase b and phase c relative to phase a are calculated, for example, by multiplying the times between zero crossings from block 414 by 360 and then dividing by the times between zero crossings from block 402.

Once the above is done, at block 418, the phasor representation of each phase is calculated using the phase angles from block 416 and the peak magnitudes from block 406. For phase a, the phase angle may be considered to be zero. The positive and negative phase sequence components of the 3-phase system are then calculated at block 420. In some embodiments, the positive sequence component of the 3-phase system may be calculated by performing the following vector calculation: I(+)=1/3*(I(a)+I(b) *1∠120+I(c) *1∠240). In some embodiments, the negative sequence component of the 3-phase phase system may be calculated by performing the following vector calculation:

$$I(-)=1/3*(I(a)+I(b)*1\angle 240+I(c)*1\angle 120).$$

Figure 5:
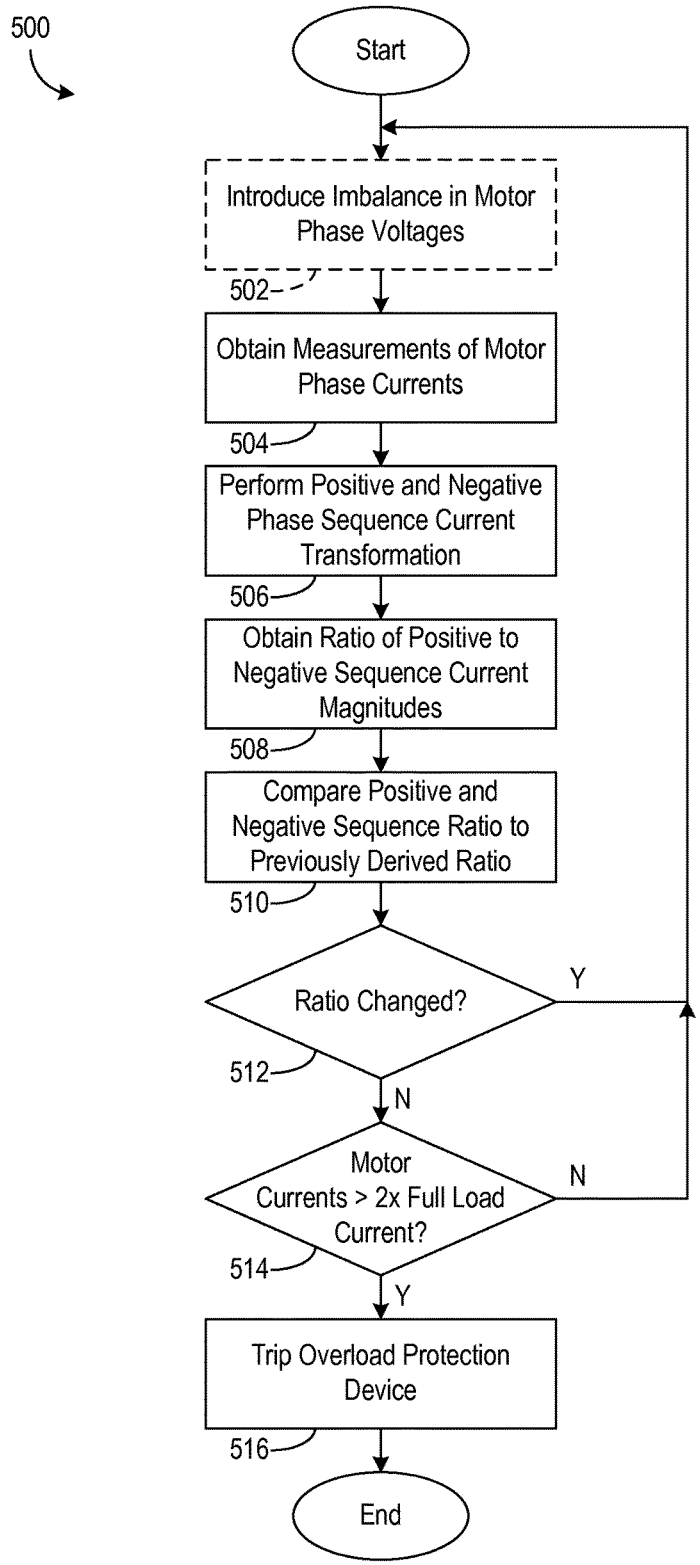
FIG. 5 is a flowchart of a method for detecting a stalled start according to some implementations of the disclosed embodiments.

Thus far, a number of specific implementations have been described for the disclosed embodiments. Following now in FIG. 5 are general guidelines in the form of a flow chart 500 that may be used to implement one or more of the disclosed embodiments. The flowchart 500 generally begins with an optional step at block 502 where an imbalance may be introduced in the phase voltages being provided to the motor in order to allow the negative phase sequence current to be used. At block 504, measurements of the motor phase currents Ia', Ib', and Ic' are obtained, and at block 506 the motor phase currents are transformed into a positive phase sequence current and a negative phase sequence current using the symmetrical components transform. At block 508, a ratio is obtained of the magnitudes of the positive and negative phase sequence currents, which are calculated using the symmetrical components transformation. The ratio may then be used as a stall indicator by comparing it to a previously obtained ratio at block 510.

A determination is made at block 512 whether the ratio has changed (decreased) from the previously obtained ratio. If the determination is yes, then the motor is considered to be starting properly, and the flowchart 500 returns to the beginning at block 502. If the determination is no, then a determination is made at block 514 whether the motor phase currents are at least twice the motor full load current. If the determination is no, then the motor is not drawing locked rotor current and is therefore not considered to be truly stalled, and the flowchart 500 again returns to the beginning at block 502. If the determination is yes, then the motor is considered to be truly stalled, and the overload protection device is tripped to remove or otherwise disconnect the motor from the power supply.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A method of detecting a stalled start in a multiphase induction motor, comprising:
    obtaining measurements of motor phase currents during a startup interval of the induction motor using a current sensor connected to the induction motor;
    deriving, using a controller, a magnitude of a positive sequence of the motor phase currents during the startup interval using the measurements of the motor phase currents;
    deriving, using the controller, a magnitude of a negative sequence of the motor phase currents during the startup interval using the measurements of the motor phase currents;
    calculating, using the controller, a stall indicator using the magnitude of the positive sequence and the magnitude of the negative sequence; and
    removing power provided to the induction motor, using the controller, if the stall indicator meets a predefined criterion;
    wherein calculating the stall indicator comprises calculating a ratio of the magnitude of the positive sequence to the magnitude of the negative sequence and the predefined criterion is met if the ratio remains substantially unchanged when compared to a ratio previously calculated during the startup interval, and a current drawn by the induction motor during the startup interval exceeds a full load current of the induction motor by a predefined amount.

2. The method of claim 1, further comprising determining whether the measurements of the motor phase currents exceed a motor full load current by a predefined amount.

3. The method of claim 1, further comprising creating an imbalance between one or more phase voltages in the power provided to the induction motor.

4. The method of claim 1, wherein the induction motor is a three-phase induction motor.

5. A detector for detecting a stalled start in a multiphase induction motor, comprising:
    a motor current acquisition module configured to obtain measurements of motor phase currents from a current sensor connected to the induction motor during a startup interval of the induction motor;
    a positive and negative sequence module configured to transform the motor phase currents into a positive phase sequence current and a negative phase sequence current; and
    a stall indication module configured to derive a ratio of a magnitude of the positive current phase sequence to a magnitude of the negative phase sequence current;
    wherein the detector is configured to cause the induction motor to be removed from a power supply thereof if the ratio remains substantially unchanged when compared to a ratio previously derived during the startup interval, and a current drawn by the induction motor during the startup interval exceeds a full load current of the induction motor by a predefined amount.

6. The detector of claim 5, wherein the induction motor is a three phase induction motor having phases "a," "b," and "c" and the positive phase sequence current has phase sequence "a-b-c."

7. The detector of claim 5, wherein the induction motor is a three phase induction motor having phases "a," "b," and "c" and the negative phase sequence current has phase sequence "a-c-b."

8. The detector of claim 5, wherein the positive and negative sequence module is configured to transform the motor phase currents using a symmetrical components transform.

9. The detector of claim 5, further comprising a phase voltage imbalance module configured to introduce an imbalance between one or more phase voltages in the power supply of the induction motor.

10. A motor management system for a multiphase induction motor, comprising:
- a power supply configured to provide power to the induction motor;
- a current sensor connected to the power supply and configured to obtain measurements of motor phase currents during a startup interval of the induction motor;
- a controller connected to the power supply and configured to control the power provided to the induction motor by the power supply; and
- an overload protection device connected to the power supply and configured to calculate a positive phase sequence current magnitude and a negative phase sequence current magnitude from the power provided to the induction motor during the startup interval of the induction motor;
- wherein the overload protection device is further configured to remove the power provided to the induction motor based on a ratio of the positive phase sequence current magnitude to the negative phase sequence current magnitude if (i) the ratio remains substantially unchanged when compared to a ratio of a previously calculated positive phase sequence current magnitude to a previously calculated negative phase sequence current magnitude, and (ii) a current drawn by the induction motor during the startup interval exceeds a full load current of the induction motor by a predefined amount.

11. The motor management system of claim 10, wherein the overload protection device removes the power provided to the induction motor if the ratio remains substantially unchanged from a ratio of a previously derived positive phase sequence current magnitude to a previously derived negative phase sequence current magnitude during the startup interval.

12. The motor management system of claim 10, wherein the overload protection device is further configured to introduce an imbalance between one or more phase voltages in the power provided to the induction motor.

13. The motor management system of claim 10, wherein the predefined amount is at least two times the full load current of the induction motor.

14. The motor management system of claim 10, wherein the predefined amount is sufficient to ensure that the induction motor is drawing locked rotor current during the startup interval.

* * * * *

UNITED STATES PATENT AND TRADEMARK OFFICE
CERTIFICATE OF CORRECTION

Page 1 of 1

PATENT NO. : 10,128,779 B2
APPLICATION NO. : 14/822675
DATED : November 13, 2018
INVENTOR(S) : Benjamin W. Edwards, Kevin M. Jeffries and Richard K. Weiler It is certified that error appears in the above-identified patent and that said Letters Patent is hereby corrected as shown below:

On the Title Page

In Item (72) Inventors, "Jeffries" should be changed to --Jefferies--.

Signed and Sealed this
Sixteenth Day of December, 2025

John A. Squires
*Director of the United States Patent and Trademark Office*